US008853301B2

(12) United States Patent
Jing et al.

(10) Patent No.: US 8,853,301 B2
(45) Date of Patent: Oct. 7, 2014

(54) AQUEOUS COATING COMPOSITION COMPRISING SPHERICAL SILICA PARTICLES AND METHOD OF MAKING AND USING THE SAME

(75) Inventors: Naiyong Jing, Woodbury, MN (US); Yifan Zhang, Woodbury, MN (US); Justin A. Riddle, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 514 days.

(21) Appl. No.: 13/201,329

(22) PCT Filed: Mar. 16, 2010

(86) PCT No.: PCT/US2010/027426
§ 371 (c)(1),
(2), (4) Date: Aug. 12, 2011

(87) PCT Pub. No.: WO2010/114698
PCT Pub. Date: Oct. 7, 2010

(65) Prior Publication Data
US 2012/0029141 A1 Feb. 2, 2012

Related U.S. Application Data

(60) Provisional application No. 61/164,979, filed on Mar. 31, 2009.

(51) Int. Cl.
C08K 7/16 (2006.01)
C09D 133/26 (2006.01)
B05D 5/08 (2006.01)
C09D 5/16 (2006.01)
C09D 133/02 (2006.01)
C09D 7/12 (2006.01)
C08K 3/36 (2006.01)

(52) U.S. Cl.
CPC .............. B05D 5/08 (2013.01); C09D 133/26 (2013.01); C09D 5/1668 (2013.01); C09D 5/1618 (2013.01); B05D 2601/22 (2013.01); C08K 3/36 (2013.01); C09D 133/02 (2013.01); B05D 2203/35 (2013.01); B05D 2202/00 (2013.01); B05D 2201/02 (2013.01); B05D 2203/30 (2013.01); C09D 7/1216 (2013.01); C09D 7/1266 (2013.01)
USPC ........ 523/223; 524/555; 427/385.5; 427/388; 427/389.7; 427/393.6

(58) Field of Classification Search
CPC ......... C08L 35/02; C08L 33/26; C08L 33/02; C08L 33/08; C08K 3/36
USPC ................ 523/223; 524/555; 427/385.5, 388; 427/389.7, 393.6
See application file for complete search history.

(56) References Cited

U.S. PATENT DOCUMENTS

| 3,316,190 A | 4/1967 | Suzumura et al. |
| 3,700,487 A | 10/1972 | Crandon et al. |
| 3,773,776 A | 11/1973 | Iler |
| 3,940,359 A | 2/1976 | Chambers |
| 4,152,165 A | 5/1979 | Langager et al. |
| 4,338,377 A | 7/1982 | Beck et al. |
| 4,576,864 A | 3/1986 | Krautter et al. |
| 4,600,735 A | 7/1986 | Larsson et al. |
| 5,073,404 A | 12/1991 | Huang |
| 5,656,685 A * | 8/1997 | Satgurunathan et al. ..... 524/460 |
| 5,820,978 A | 10/1998 | Huang |
| 5,939,182 A | 8/1999 | Huang et al. |
| 6,251,523 B1 | 6/2001 | Takahashi et al. |
| 6,398,827 B1 * | 6/2002 | Ota et al. .......................... 51/308 |
| 6,849,584 B2 * | 2/2005 | Geary et al. ................... 510/119 |
| 7,066,998 B2 | 6/2006 | Rohrbaugh et al. |
| 7,112,621 B2 | 9/2006 | Rohrbaugh et al. |
| 7,196,043 B2 | 3/2007 | Valpey, III et al. |
| 7,267,728 B2 | 9/2007 | Barger et al. |
| 7,957,621 B2 | 6/2011 | Zhang et al. |
| 7,973,096 B2 | 7/2011 | Anderson et al. |
| 2002/0151634 A1 | 10/2002 | Rohrbaugh et al. |
| 2004/0034157 A1 | 2/2004 | Ghosh et al. |
| 2005/0239674 A1 | 10/2005 | Dreja et al. |
| 2006/0204655 A1 | 9/2006 | Takahashi |
| 2008/0153963 A1 | 6/2008 | Baran et al. |
| 2009/0048571 A1 | 2/2009 | Catalan et al. |
| 2010/0035039 A1 | 2/2010 | Jing et al. |
| 2010/0092765 A1 | 4/2010 | Hager et al. |
| 2010/0150513 A1 | 6/2010 | Zhang et al. |
| 2011/0028591 A1 | 2/2011 | Anderson et al. |
| 2011/0033694 A1 | 2/2011 | Jing et al. |
| 2012/0276369 A1 * | 11/2012 | Jing et al. ...................... 428/331 |
| 2013/0213454 A1 * | 8/2013 | Brown et al. .................. 136/246 |

FOREIGN PATENT DOCUMENTS

| CN | 1517411 | 8/2004 |
| EP | 0 787 830 A2 | 8/1997 |

(Continued)

OTHER PUBLICATIONS

International Search Report, PCT/US2010/027426, mailed May 25, 2010, 3 pages.
Written Opinion of the International Searching Authority, PCT/US2010/027426, mailed May 25, 2010, 7 pages.
Percy et al., "Synthesis and Characterization of Vinyl Polymer-Silica Colloidal Nanocomposites", Langmuir, 2000, vol. 16 (17), pp. 6913-6920.

(Continued)

Primary Examiner — Hannah Pak
(74) Attorney, Agent, or Firm — Bradford B. Wright

(57) ABSTRACT

Compositions include a polymer and silica nanoparticles dispersed in an aqueous continuous liquid phase. The polymer is a water-soluble copolymer of acrylic acid and an acrylamide, or a salt of the same. Methods of making and using the compositions to coat a substrate are also disclosed.

15 Claims, 1 Drawing Sheet

(56) References Cited

FOREIGN PATENT DOCUMENTS

| | | |
|---|---|---|
| GB | 983128 | 2/1965 |
| GB | 1 541 022 | 2/1979 |
| GB | 2 433 516 A | 6/2007 |
| JP | 56-112984 A | 9/1981 |
| KR | 10-2007-0014627 | 2/2007 |
| WO | WO 99/28373 A1 | 6/1999 |
| WO | WO 2007/068870 A1 | 6/2007 |
| WO | WO 2007/068939 A1 | 6/2007 |
| WO | WO 2009/085680 A1 | 7/2009 |
| WO | WO 2009/137188 A1 | 11/2009 |
| WO | WO 2009/140482 A1 | 11/2009 |
| WO | WO 2010/114698 A1 | 10/2010 |
| WO | WO 2010/114700 A1 | 10/2010 |
| WO | WO 2010/135140 A2 | 11/2010 |
| WO | WO 2011/002838 | 1/2011 |

OTHER PUBLICATIONS

Duguet et al., "From Raspberry-like to Dumbbell-like Hybrid Colloids through Surface-assisted Nucleation and Growth of Polystyrene Nodules onto Macromonomer-modified Silica Nanoparticles", Master. Res. Soc. Symp. Proc., 2005, vol. 847, pp. EE1.1.1-EE1.1.10.

Ming, "Easy-to-Clean Coatings", Materials Science Program Nanostructured Polymers Research Center University of New Hampshire Durham, NH, Paper presented at Am. Coat. Conference, Jun. 2-5, 2008, Charlotte, NC, 29 pages.

Song et al., "Synthesis of Hydrophilic Coating Solution for Polymer Substrate Using Glycidoxypropyltrimethoxysilane", Journal of Sol-Gel Science and Technology, 2003, vol. 27, pp. 53-59.

Wu, "Nature-inspired superlyophobic surfaces", Dissertation, Eindhoven University of Technology Library, 2007, 125 pages ISBN: 978-90-386-1126-6.

Xu et al., "Synthesis of raspberry-like magnetic polystyrene microspheres", Materials Chemistry and Physics, 2007, vol. 103, pp. 494-499.

Zhang et al., "Self-Cleaning Particle Coating with Antireflection Properties", Chemistry of Materials, 2005, vol. 17 (3), pp. 696-700.

Shabanova et al., "Aggregation Stability of Colloidal Silica Sol-Polystyrene Latex Mixtures", Colloid Journal. vol. 63, No. 5, 2001, pp. 649-652. Translated from Kolloidnyi Zhurnal, 2001, vol. 63, No. 5, pp. 711-714.

Luna-Xavier et al., "The role of initiation in the synthesis of silica/poly(methyl methacrylate) nanocomposites latex particles through emulsion polymerization", Colloid Polym. Sci., 2001, vol. 279, pp. 947-958.

Co-pending U.S. Appl. No. 13/201,288, entitled "Coating Composition and Method of Making and Using the Same", 371(c) date Aug. 12, 20-11, Jing et al.

Co-pending U.S. Appl. No. 12/809,388, entitled "Removable Antifogging Coatings, Articles, Coating Compositions, and Methods", 371(c) date Feb. 17, 2011, Jing et al.

Co-pending U.S. Appl. No. 13/378,182, entitled Hydrophilic Coatings, Articles, Coating Compositions and Methods, 371(c) date Dec. 14, 2011, Jing et al.

\* cited by examiner

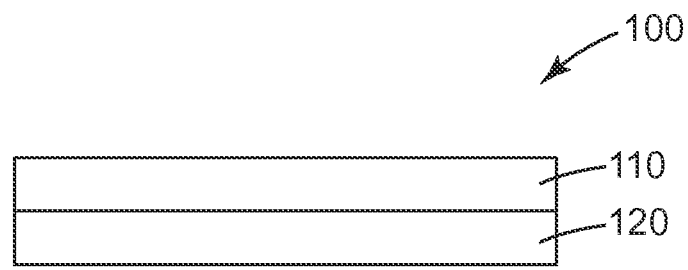

AQUEOUS COATING COMPOSITION COMPRISING SPHERICAL SILICA PARTICLES AND METHOD OF MAKING AND USING THE SAME

CROSS-REFERENCE TO RELATED APPLICATIONS

This application is a national stage filing under 35 U.S.C. 371 of PCT/US2010/027426, filed Mar. 16, 2010, which claims priority to U.S. Provisional Application No. 61/164979, filed Mar. 31, 2009, and the disclosure of which is incorporated by reference in its entirety herein.

TECHNICAL FIELD

The present disclosure broadly relates to compositions useful for coating a substrate.

BACKGROUND

There have been many efforts to develop compositions that can be applied to substrates to provide a beneficial protective layer with desirable properties such as one or more of easy cleaning, stain prevention, long lasting performance, soap scum deposit inhibition, and the like. Many compositions developed for such applications rely on materials (for example, volatile organic solvents) that can present environmental issues and/or involve complex application processes. Further, problems relating to inadequate shelf-life continue to plague product developers of such compositions.

Accordingly, for many consumer products a tradeoff of attributes is typically struck between the desired performance attributes, environmental friendliness of the materials, shelf-life, and ease of use by a relatively unskilled user.

There remains a need for shelf-stable environmentally friendly compositions that can be coated on a substrate (for example, a bathroom fixture or a window) to provide long lasting protection from soil and stain accumulation, especially if they can be readily handled by a relatively unskilled user.

SUMMARY

In one aspect, the present disclosure provides a composition comprising:
an aqueous continuous liquid phase;
spherical silica particles dispersed in the aqueous continuous liquid phase, wherein the spherical silica particles have a volume average particle diameter of 60 nanometers or less; and
a water-soluble copolymer of acrylic acid and an acrylamide, or a salt thereof, wherein the acrylamide is represented by the formula

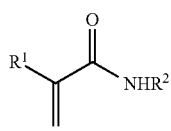

wherein $R^1$ is H or a methyl group and $R^2$ is H or $R^3SO_3H$, and wherein $R^3$ is an alkylene group having from 2 to 6 carbon atoms, with the proviso that if $R^2$ is H, then a weight ratio of the acrylamide to the acrylic acid is in a range of from 20:80 to 95:5. For simplicity, this polymer will also be referred to herein as the "water-soluble copolymer".

In some embodiments, a weight ratio of the spherical silica particles to the water-soluble copolymer of acrylic acid and acrylamide is at least 85:15, and
wherein a weight ratio of the spherical silica particles to the water-soluble copolymer of acrylic acid and an acrylamide, or a salt thereof, is in a range of from 70:30 to 97:3.

In some embodiments, the composition has a metal ion concentration of less than 60 parts per million by weight based on a total weight of the composition.

In some embodiments, the composition has a pH value of less than 5. In some embodiments, the composition is free of acicular silica particles.

In another aspect, the present disclosure provides a method of making an article that comprises applying the compositions to a surface of a substrate and at least partially removing the aqueous continuous liquid phase from the composition. In some embodiments, the surface comprises at least one of glass, metal, fiberglass, or ceramic. In some embodiments, the surface comprises an organic polymer (for example, fiberglass). In some embodiments, the substrate is selected from the group consisting of shower surrounds, bathtubs, toilets, sinks, faucets, windows, and mirrors. In some embodiments, the substrate comprises a painted surface or a clearcoat surface.

In yet another aspect, the present disclosure provides articles made by the foregoing method.

In yet another aspect, the present disclosure provides a method comprising combining:
an aqueous dispersion of spherical silica particles, wherein the spherical silica particles have a volume average particle diameter of 60 nanometers or less; and
an aqueous solution comprising a water-soluble copolymer of acrylic acid and an acrylamide, or a salt thereof, wherein the acrylamide is represented by the formula

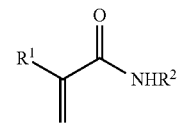

to provide a composition, wherein $R^1$ is H or a methyl group and $R^2$ is H or $R^3SO_3H$, and wherein $R^3$ is an alkylene group having from 2 to 6 carbon atoms, with the proviso that if $R^2$ is H, then a weight ratio of the acrylamide to the acrylic acid is in a range of from 20:80 to 95:5, and wherein a weight ratio of the spherical silica particles to the water-soluble copolymer of acrylic acid and an acrylamide, or a salt thereof, is in a range of from 70:30 to 97:3. In some embodiments, the method further comprises contacting the composition with a protonated cation exchange resin. In some embodiments, the composition is free of acicular silica particles.

Advantageously, compositions according to the present disclosure provide long lasting useful levels of protection from mineral and soap deposit stains when applied to common substrates having a hard surface; for example, those that may be found in or around a home, motor vehicle, boat, or office. Moreover, the compositions may be formulated to contain little or no volatile organic solvents, are typically easy to apply, and may exhibit extended shelf stability.

As used herein,
the term "aqueous" means containing at least 5 percent by weight of water;

the phrase "spherical silica particles" refers to silica nanoparticles having a generally spherical appearance, although minor amounts of flat spots and/or depressions may be present at the surface;

the phrase "volatile organic solvent" refers to an organic solvent having a normal boiling point of 250° C. or less; and the term "water-soluble" means soluble in water in some amount.

BRIEF DESCRIPTION OF THE DRAWING

FIG. 1 is a schematic cross-sectional view of an exemplary article according to the present disclosure.

DETAILED DESCRIPTION

Compositions according to the present disclosure comprise an aqueous continuous liquid phase, a water-soluble copolymer of acrylic acid and an acrylamide, or a salt thereof and silica particles having a mean particle size of 60 nm or less.

The aqueous continuous liquid phase comprises at least 5 percent by weight of water; for example, the aqueous continuous liquid phase may comprise at least 50, 60, 70, 80, or 90 percent by weight of water, or more. While the aqueous continuous liquid phase is preferably essentially free of (that is, contains less than 0.1 percent by weight of based on the total weight of the aqueous continuous liquid phase) organic solvents, especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, butanol, n-propanol, glycerin, ethylene glycol, triethylene glycol, propylene glycol, ethylene or propylene glycol monomethyl or monoethyl ether, diethylene or dipropylene glycol methyl or ethyl ether, ethylene or propylene glycol dimethyl ether, and triethylene glycol monomethyl or monoethyl ether.

In order to minimize haze, the spherical silica particles have a volume average particle diameter (that is, a $D_{50}$) of 60 nanometers (nm) or less. Preferably, the spherical silica particles have a volume average particle diameter in a range of from 0.5 to 60 nm, more preferably in a range of from 1 to 20 nm, and still more preferably in a range of from 2 to 10 nm. The silica particles may have any particle size distribution consistent with the above 60 nm volume average particle diameter; for example, the particle size distribution may be monomodal or polymodal.

Spherical silica particles in aqueous media (sols) are well known in the art and are available commercially; for example, as silica sols in water or aqueous alcohol solutions under the trade designations LUDOX from E. I. du Pont de Nemours and Co. of Wilmington, Del.), NYACOL from Nyacol Co. of Ashland, Mass. or NALCO from Nalco Chemical Co. of Naperville, Ill. One useful silica sol with a volume average particle size of 5 nm, a pH of 10.5, and a nominal solids content of 15 percent by weight, is available as NALCO 2326 from Nalco Chemical Co. Other useful commercially available silica sols include those available as NALCO 1115 and NALCO 1130 from Nalco Chemical Co., as REMASOL SP30 from Remet Corp. of Utica, N.Y., and as LUDOX SM from E. I. du Pont de Nemours and Co.

Non-aqueous spherical silica sols are spherical silica sol dispersions wherein the liquid phase is an organic solvent.

Typically, the silica sol is chosen so that its liquid phase is compatible with the remaining components of the continuous liquid phase. Typically, sodium-stabilized spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

Compositions according to the present disclosure include a water-soluble copolymer of acrylic acid and an acrylamide, or a salt thereof (that is, a salt of the copolymer), wherein the acrylamide is represented by the formula

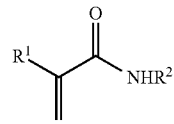

wherein $R^1$ is H or a methyl group and $R^2$ is H or —$R^3SO_3H$. $R^3$ is an alkylene group having from 2 to 6 carbon atoms (for example, ethylene, propylene, butylene, or hexylene). If $R^2$ is H, then a weight ratio of the acrylamide to the acrylic acid is in a range of from 20:80 to 95:5. If $R^2$ is —$R^3SO_3H$, then the content of —$R^3SO_3H$ may typically be in a range of from about 5 percent to about 60 percent based on the total weight of the copolymer, although other ratios may also be used.

The water-soluble copolymer of acrylic acid and an acrylamide, or a salt thereof, may be prepared by well known polymerization techniques from the corresponding monomers, optionally with an additional neutralization step, or from commercial sources. Examples of commercially available copolymers of acrylic acid and acrylamide, and salts thereof, include those available from Polysciences, Inc. of Wallington, Pa. under the trade designations: POLY(ACRYLAMIDE/ACRYLIC ACID) 90:10, NA SALT MW 200,000; POLY(ACRYLAMIDE/ACRYLIC ACID) 30:70, NA SALT MW 200,000; and POLY(ACRYLAMIDE/ACRYLIC ACID) [60:40] 60:40, NA SALT MW>10,000,000. Additional examples include 2-propenoic acid, telomer with 2-methyl-2-[(1-oxo-2-propenyl)amino]-1-propanesulfonic acid monosodium salt and 2-propanol, sodium salt (CAS No. 130800-24-7) as available as AQUATREATAR-546 and sodium acrylate-sodium 2-acrylamido-2-methylpropanesulfonate copolymer (C.A.S. No. 37350-42-8) as available as AQUATREATAR-546 both from Alco Chemical of Chattanooga, Tenn.

In order to achieve desirable coating characteristics, the weight ratio of spherical silica particles to the water-soluble copolymer of acrylic acid and an acrylamide, or a salt thereof, included in the composition is in a range of from 70:30 to 97:3, preferably 80:20 to 95:5, and more preferably 85:15 to 95:5.

In addition, to facilitate coating, coating compositions according to the present disclosure preferably have a pH of less than 5, more preferably less than 4, and more still preferably less than 3. To facilitate handling, the coating compositions preferably have a pH of at least 1, more preferably at least 2. In some embodiments, for example, those involving an acid sensitive substrate, it may be preferable to adjust the pH to a value of from about 5 to about 7.5, although this may tend to degrade the coating appearance in some cases.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, formic acid, propionic acid, benzenesulfonic acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, and $H_3PO_4$. Combinations of organic and inorganic acids may also be used. Using weaker acids having a $pK_a$ of greater than 5 may not result in a uniform coating having the desirable properties such as transmissivity, cleanability and/or durability. In particular, coating compositions with weaker acids, or basic coating compositions, typically bead up on the surface of a polymeric substrate.

Compositions according to the present disclosure may optionally include at least one surfactant and/or leveling agent. The term "surfactant" as used herein describes molecules with hydrophilic (polar) and hydrophobic (non-polar) segments on the same molecule, and which are capable of reducing the surface tension of the composition. Examples of useful surfactants include: anionic surfactants such as sodium dodecylbenzenesulfonate, dioctyl ester of sodium sulfosuccinic acid, polyethoxylated alkyl ($C_{12}$) ether sulfate, ammonium salt, and aliphatic sulfates; cationic surfactants such as alkyldimethylbenzylammonium chlorides and di-tallowdimethylammonium chloride; nonionic surfactants such as block copolymers of polyethylene glycol and polypropylene glycol, polyoxyethylene (7) lauryl ether, polyoxyethylene (9) lauryl ether, and polyoxyethylene (18) lauryl ether; and amphoteric surfactants such as N-coco-aminopropionic acid. Silicone and fluorochemical surfactants such as those available under the trade designation FLUORAD from 3M Company of St. Paul, Minn. may also be used. If present, the amount of surfactant typically is in an amount of less than about 0.1 percent by weight of the composition, preferably between about 0.003 and 0.05 percent by weight of the composition.

The composition may also optionally contain an antimicrobial agent. Many antimicrobial agents are commercially available. Examples include those available as: KATHON CG available from Rohm and Haas Co. of Philadelphia, Pa.; 1,3-dimethylol-5,5-dimethylhydantoin; 2-phenoxyethanol; methyl-p-hydrobenzoate; propyl-p-hydrobenzoate; alkyldimethylbenzylammonium chloride; and benzisothiazolinone.

Compositions according to the present disclosure may be made by any suitable mixing technique. One useful technique includes combining an aqueous solution of the water-soluble polymer of acrylic acid and an acrylamide, or a salt thereof, with an aqueous or solvent borne dispersion of spherical silica particles, and then adjusting the pH to the final desired level.

The compositions preferably have a low cationic species (other than $H^+$ and $H_3O^+$) level of less than 100 parts per million by weight (ppm), more preferably less than 60 ppm, based on a total weight of the composition. This may be accomplished by contacting the composition with a protonated cation exchange resin (that is, wherein the cations have been exchanged with protons). Exemplary cation exchange resins include AMBERLITE IR-120 PLUS(H) from Dow Chemical Co. The ion exchange step may be carried out in a batch-wise or continuous process (for example, using an ion exchange column).

In some embodiments, the compositions are free of various impurities including, nonspherical silica particles, and added crosslinkers (for example, orthosilicates and/or silanol ethers). Accordingly, compositions according to the present disclosure may contain less than 0.1 weight percent or less than 0.01 weight percent of acicular silica particles, and, if desired, they may be free of acicular silica particles.

Compositions according to the present disclosure are useful, for example, for coating a substrate. Referring now to FIG. 1, an article 100 comprises a substrate 120 having a layer 110 disposed thereon. Layer 110 is formed by applying a composition according to the present disclosure to a surface of a substrate and at least partially removing the aqueous continuous liquid phase from the composition.

Suitable substrates may include, for example, glass (for example, windows (including architectural and motor vehicle windows) and optical elements such as, for example, lenses and mirrors), ceramic (for example, ceramic tile), cement, stone, painted and/or clearcoat surfaces (for example, automobile or truck body or closure panels, boat surfaces, motorcycle parts, truck tractors, snowmobiles, jet skis, off-road vehicles, and tractor trailers), appliances, plastic protective films which are backed with pressure-sensitive adhesives, metal (for example, architectural columns, plumbing fixtures), fiberglass, thermosetting polymers, sheet molding compound, thermoplastics (for example, polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. Additional exemplary substrates include bathtubs, toilets, sinks, faucets, mirrors, windows.

In some embodiments, compositions according to the present disclosure, when coated on a substrate and at least partially dried, provide improved cleanability by way of a reduced tendency to accumulate dirt and other contaminants. By "cleanable" it is meant that compositions according to the present disclosure, when dried and cured, provide a coating which is easier to clean by contacting with flowing water or a water spray to readily displace overlying contamination, thereby removing a substantial portion of the contamination from the coating. The water sheeting effect allows road spray, snow, slush dirt, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion and solvents.

The compositions are preferably coated on the article using conventional coating techniques, such as brush, bar, roll, wipe, curtain, rotogravure, spray, or dip coating techniques. For ease and simplicity, a preferred method is to wipe the coating formulation on using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating using any suitable method and, after allowing a portion of the solvent to evaporate, to rinse off excess composition with a stream of water, while the substrate is still fully or substantially wetted with the composition.

Compositions according to the present disclosure are preferably applied to a substrate in a uniform average thickness varying from 50 to 5000 nanometers (nm), and more preferably less than 500 nm, in order to avoid visible interference color variations in the coating and/or hazy appearance, although other thicknesses may also be used.

The optimal average dry coating thickness is dependent upon the particular composition that is coated, but in general the average dry thickness of the composition is between 5 and 1000 nm, preferably 50 to 500 nm (for example, as estimated from atomic force microscopy and/or surface profilometry), although other thicknesses may be used. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most coatings exposed to environmental wear.

After coating the surface of the substrate, the resultant article may be dried at ambient temperatures without the need for heat, radiation or other curing method. Higher temperature may increase the speed of the drying process, such temperatures may not practical or convenient and care must be exercised to avoid damage to the substrate, although this is not a requirement.

Preferably, compositions according to the present disclosure are stable when stored in the liquid form, for example, they do not gel, opacify, form precipitated or agglomerated particulates, or otherwise deteriorate significantly.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials

Spherical silica particle dispersions were obtained from Nalco Company of Naperville, Ill. as NALCO 1115 (4 nm volume average particle size, 16.5 weight percent), NALCO 2326 (5 nm volume average particle size, 16.2 weight percent), and NALCO 1050 (22 nm volume average particle size, 50 weight percent);

ACRYLIC COPOLYMER, POLY (ACRYLAMIDE ACRYLIC ACID SODIUM SALT) ("PAA1"), MW=200,000 G/MOLE, 10% CARBOXYL was obtained from Polysciences Inc. of Warrington, Pa.;

ACRYLIC COPOLYMER, POLYACRYLAMIDE CARBOXYL MODIFIED ("HIGH CARBOXYL") ("PAA2") was obtained from Scientific Polymer Products Inc. of Ontario, N.Y.;

ACRYLIC COPOLYMER, POLY(ACRYLIC ACID-CO-MALEIC ACID) SODIUM SALT MW ~50,000 G/MOLE ("PAA3") was obtained from Aldrich Chemical of Milwaukee, Wis.;

ACRYLIC COPOLYMER, POLY(ACRYLAMIDE-ACRYLIC ACID, SODIUM SALT) MW ~200,000 G/MOLE, 70% CARBOXYL ("PAA4") was obtained from Polysciences Inc.;

ACRYLIC COPOLYMER, 2-PROPENOIC ACID, TELOMER WITH 2-METHYL-2-[(1-OXO-2-PROPENYL)AMINO]-1-PROPANESULFONIC ACID MONOSODIUM SALT ("PAAS"), MW≥9,900 (AQUATREAT AR-546) was obtained from Alco Chemical Company of Chattanooga, Tenn.; and AMBERLITE IR-120 PLUS(H), ION EXCHANGE RESIN was obtained from Alfa Aesar of Ward Hill, Mass.

Test Methods

Contact Angle Measurement

Static water contact angle measurements were made on the dried coated samples using as-received deionized water filtered through a filtration system obtained from Millipore Corporation of Billerica, Mass. on a video contact angle analyzer available as product number VCA-2500XE from AST Products of Billerica, Mass. Reported values are the averages of measurements on at least three drops measured on the right and the left sides of the drops. Drop volumes were one microliter for static measurements.

Cleaning Performance Test

Specimens for the cleaning performance test were prepared by coating float glass panels (3 inches×6 inches) (7.6 cm×15.2 cm) with the example solutions using a KIM-WIPE paper wiper (available from Kimberly-Clark of Dallas, Tex.). Prior to coating, the glass panels were cleaned with a cleaning solution (ALCONOX POWDERED PRECISION CLEANER from Alconox, Inc. of White Plains, N.Y.) dissolved in water according to the manufacturer's directions. The samples were allowed to air dry for at least 2 hours before coating. Five drops of a coating composition to be evaluated were applied to a glass panel with a 1-milliliter (mL) disposable pipette, and the coating composition was uniformly spread over the surface of the panel with the KIM-WIPE paper wiper. Each sample was allowed to air-dry for at least 60 minutes.

Three sprays of prepared soap scum (below) were applied to each coated sample using a spray bottle. The samples were then allowed to air dry for 15 minutes before an additional three sprays were applied. This process was repeated for a total of three applications. The samples were then subjected to rinsing with a low-pressured water stream at a speed of 600 mL/minute and were allowed to air-dry to complete one performance cycle. The sample surfaces were then visually examined to determine if any soap scum residue remained after rinsing. The cleaning performance of the coatings was visually ranked on a scale of 1-5 as defined below.

5: excellent (soap scum completely removed)
  4: very good (soap scum remained less than 2 percent in surface area)
  3: good (soap scum remained less than 5 percent in surface area)
  2: fair (soap scum remained less than 10 percent in surface area)
  1: poor (soap scum remained in more than 15-20 percent in surface area)

Soap Scum Preparation

Crushed IVORY soap (The Procter and Gamble Co. of Cincinnati, Ohio, 1.6 grams) was added to hot tap water (192 grams) in a first vessel and then the mixture was sonicated for 30 minutes at 60° C. Subsequently, artificial sebum (1.2 grams) was added and the mixture was sonicated for an additional 10 minutes. A second vessel was charged with hot tap water (600 grams), CLAIROL TOTALLY TWISTED HERBAL ESSENCE shampoo (The Procter and Gamble Co., 1.6 grams), CLAIROL COLOR ME HAPPY HERBAL ESSENCE conditioner (The Procter and Gamble Co., 4.0 grams), and then stirred for 15 seconds. Oleic acid (1.6 grams) was added to the shampoo solution and the solution was then stirred for an additional 15 seconds. The contents of both solutions were ten combined and mixed for an additional 2 hours.

Extractable Cation (Na$^-$) Measurement Procedure

Samples (5 percent by weight solids in water) were diluted 75-, 25-, 10-, 5- and 1-fold into a small polypropylene snap-cap microcentrifuge tube (1.5 mL total sample volume). The tubes were shaken vigorously by hand for a few minutes. The tubes were then placed in a microcentrifuge at 10,000 rpm for 10-90 minutes to settle the particles. An aliquot of the supernatant was transferred to an autosampler vial and injected onto a model ICS-3000 dual-channel ion chromatograph from Dionex Corp. of Sunnyvale, Calif. with suppressed conductivity detection. A ramp/step hydroxide gradient profile was applied, and the analysis was performed on a CG12A and CS12A column set, and 20 mM MSA isocratic elution. Blanks were also carried through this procedure for comparison.

Sample Preparation

Spherical silica particle dispersions and aqueous solutions of PAA or PAAS copolymers were combined and diluted to 5 weight percent solids with deionized water to form a coating dispersion. The mixtures were acidified to the pH values indicated in Tables 1-6 by ion exchange (IEX) or by acid addition.

For the IEX procedure (Acidification Method A), a disposable syringe (5 mL) was packed with glass wool followed by 1-2 cm$^3$ of AMBERLITE IR-120 PLUS(H) ion exchange resin. The packed bead bed was rinsed with deionized water (2×2 mL portions) before passing 10 gram samples of the coating dispersion through the resin beads until the desired pH value was obtained, sometimes requiring multiple passes. The pH was monitored after each pass with pH paper or a pH meter.

Alternatively, the solution of the nanoparticles was acidified with $H_3PO_4$ (1.0 M) to the noted pH while mixing on a stirring plate with a magnetic stirrer (Acidification Method B). The samples were then coated on glass panels for testing as described above.

Examples 1-4 and Comparative Example A

Samples were prepared as described above having the compositions indicated in Table 1 and were tested for cleaning performance. An uncoated glass panel was also tested as a control sample (Comparative Example A).

TABLE 1

| EX-AMPLE | COMPOSITION (weight/weight) | ACIDI-FICATION METHOD | pH | SOAP SCUM CLEANING PERFORMANCE RATING |
|---|---|---|---|---|
| 1 | Nalco 1115/PAA1 (90:10) | A | 4 | 5 |
| 2 | Nalco 2326/PAA1 (90:10) | A | 4 | 4.5 |
| 3 | Nalco 1115/PAA1 (90:10) | B | 4 | 5 |
| 4 | Nalco 2326/PAA1 (90:10) | B | 4 | 4.5 |
| Comparative Example A | no coating | not applicable | not applicable | 1 |

Examples 5-9

Examples 5-9 were prepared to evaluate the effect of aging on the cleaning performance. The samples used for Examples 5-9 were prepared as described above and the compositions of the mixtures, aging conditions, and cleaning performance data are reported in Table 2. In Table 2, Acidification Method C was Acidification Method A followed by storage at 25° C. for 5 days before testing, Acidification Method D was Acidification Method A followed by storage at 48° C. for 5 days.

TABLE 2

| EX-AMPLE | COMPOSITION (weight/weight) | ACIDI-FICATION METHOD | pH | SOAP SCUM CLEANING PERFORMANCE RATING |
|---|---|---|---|---|
| 5 | Nalco 1115/PAA1 (90:10) | C | 4 | 5 |
| 6 | Nalco 1115/PAA1 (90:10) | D | 4 | 4.5 |
| 7 | Nalco 1115/PAA1 (90:10) | B | 4 | 5 |
| 8 | Nalco 2326/PAA1 (90:10) | C | 4 | 5 |
| 9 | Nalco 2326/PAA1 (90:10) | B | 4 | 5 |

Examples 10-11 and Comparative Example B

The samples used for Examples 10-11 were prepared as described above using the components and amounts reported in Table 3. Three cleaning performance test cycles were carried out and contact angle measurements and cleaning ratings were obtained after each cycle. An uncoated glass panel was also tested as a control (Comparative Example B. Compositions and test results are reported in Table 3. Examples 10 and 11 were acidified according to Acidification Method B except that 1N HCl was used instead of phosphoric acid.

TABLE 3

| EXAMPLE | COMPOSITION | pH | STATIC CONTACT ANGLE (INITIAL) | STATIC CONTACT ANGLE ($1^{ST}$ CYCLE) | STATIC CONTACT ANGLE ($2^{ND}$ CYCLE) | STATIC CONTACT ANGLE ($3^{RD}$ CYCLE) | SOAP SCUM CLEANING PERFORMANCE RATING |
|---|---|---|---|---|---|---|---|
| 10 | 5 percent of PAA4 in water | 5 | 5.3 | 11.0 | 28.3 | 23.3 | 5 |
| 11 | 5 percent of PAA2 in water | 4.5 | 5.1 | 8.1 | 12.0 | 11.0 | 3 |
| Comparative Example B | uncoated glass | | 16.0 | 55.4 | 66.3 | 70.3 | 1 |

Examples 12-35

Examples 12-35 were prepared to study the stability of the coating dispersions. The samples used for Examples 12-23 were prepared as described above. Their compositions are reported in Tables 4 and 5. In Table 4, the pH of the mixtures was adjusted by Acidification Method A to the values indicated. In Table 5, the pH of the mixtures was adjusted to the values indicated according to Acidification Method B except that 1N HCl was used instead of phosphoric acid. For each example, a one gram aliquot of the coating dispersion (5 weight percent solids) was removed and placed in a 48° C. oven, and the sample was periodically monitored for solution stability or gelation. Additional aliquots were removed and diluted accordingly with deionized water to prepare samples at 2 weight percent solids and samples at 2.5 weight percent solids as indicated in the Tables. These aliquots were similarly monitored for solution stability or gelation after being placed in a 48° C. oven. Results are reported in Tables 4 and 5, wherein "S" means not gelled, "G" means gelled, and "ND" means not determined.

TABLE 4

| EXAMPLE | COMPOSITION | WEIGHT PERCENT SOLIDS | pH | $NA^+$ CONCENTRATION (µg/ml) | 3 DAYS | 13 DAYS | 27 DAYS |
|---|---|---|---|---|---|---|---|
| 12 | Nalco 1115/PAA1 (90:10) | 5 | 3 | 42 ± 7 | S | G | ND |
| 13 | Nalco 1115/PAA1 (90:10) | 2 | 3 | ND | S | S | S |
| 14 | Nalco 1115/PAAS (90:10) | 5 | 2 | 67 ± 2 | S | S | S |
| 15 | Nalco 1115/PAAS (90:10) | 2 | 2 | ND | S | S | S |
| 16 | Nalco 2326/PAA1 (90:10) | 5 | 3 | ND | S | G | ND |
| 17 | Nalco 2326/PAA1 (90:10) | 2 | 3 | ND | S | S | S |
| 18 | Nalco 2326/PAAS (90:10) | 5 | 2 | ND | S | S | S |
| 19 | Nalco 2326/PAAS (90:10) | 2 | 2 | ND | S | S | S |
| 20 | Nalco 1050/PAA1 (90:10) | 5 | 3 | 69 ± 2 | S | S | S |
| 21 | Nalco 1050/PAA1 (90:10) | 2 | 3 | ND | S | S | S |
| 22 | Nalco 1050/PAAS (90:10) | 5 | 3 | 225 ± 5 | S | S | S |
| 23 | Nalco 1050/PAAS (90:10) | 2 | 3 | ND | S | S | S |

TABLE 5

| EXAMPLE | COMPOSITION | WEIGHT PERCENT SOLIDS | $NA^+$ CONCENTRATION (µg/ml) | pH | 7 DAYS | 14 DAYS |
|---|---|---|---|---|---|---|
| 24 | Nalco 1115/PAA1 (90:10) | 5 | 1,460 ± 15 | 3 | S | G |
| 25 | Nalco 1115/PAA1 (90:10) | 2.5 | ND | ND | S | S |
| 26 | Nalco 1115/PAAS (90:10) | 5 | 1,790 ± 25 | 3 | G | ND |
| 27 | Nalco 1115/PAAS (90:10) | 2.5 | ND | ND | S | G |
| 28 | Nalco 1050/PAA1 (90:10) | 5 | 573 ± 13 | 3 | S | G |
| 29 | Nalco 1050/PAA1 (90:10) | 2.5 | ND | ND | S | S |
| 30 | Nalco 1050/PAAS (90:10) | 5 | 940 ± 35 | 3 | S | S |
| 31 | Nalco 1050/PAAS (90:10) | 2.5 | ND | ND | S | S |
| 32 | Nalco 2326/PAA1 (90:10) | 5 | ND | 3 | G | ND |
| 33 | Nalco 2326/PAA1 (90:10) | 2.5 | ND | ND | S | G |
| 34 | Nalco 2326/PAAS (90:10) | 5 | ND | 3 | G | ND |
| 35 | Nalco 2326/PAAS (90:10) | 2.5 | ND | ND | G | ND |
| 36 | Nalco 1115/PAA1 (90:10) | 1 | ND | 3 | S | S |

Examples 37-41

The compositions used for Examples 37-41 were prepared as described above and samples diluted to the weight percent solids indicated in Table 6. In Table 6, the pH of the mixtures was adjusted to the values indicated according to Acidification Method B except that 1N HCl was used instead of phosphoric acid. Three cleaning performance cycles were carried out and contact angle measurements and cleaning performance data were obtained after each cycle. Compositions and test results are given in Table 6.

TABLE 6

| EXAMPLE | COMPOSITION | WEIGHT PERCENT SOLIDS | pH | STATIC CONTACT ANGLE (INITIAL) | STATIC CONTACT ANGLE ($1^{ST}$ CYCLE) | STATIC CONTACT ANGLE ($2^{ND}$ CYCLE) | STATIC CONTACT ANGLE ($3^{RD}$ CYCLE) | SOAP SCUM CLEANING PERFORMANCE RATING |
|---|---|---|---|---|---|---|---|---|
| 37 | Nalco 1115/PAA1 (90:10) | 2 | 5 | 9 | 12 | 13 | 14 | 3.5 |
| 38 | Nalco 1115/PAA1 (70:30) | 2 | 5 | 8 | 14 | 15 | 16 | 3 |
| 39 | Nalco 1115/PAA1 (90:10) | 1 | 5 | 7 | 13 | 33 | 31 | 3 |
| 40 | Nalco 1115/PAA1 (70:30) | 1 | 5 | 12 | 14 | 16 | 15 | 3.5 |
| 41 | Nalco 1115/PAA1 (50:50) | 1 | 5 | 12 | 17 | 22 | 15 | 3.5 |

Example 42

An aqueous coating with 5 percent by weight total solids and a 90:10 ratio of NALCO 1115 silica particles to polyacrylic-acrylamide copolymer PAA1 having a pH ~3 after acidification with HCl was diluted to 1.28% solids by combining 0.550 grams of the mixture with 1.591 grams deionized water. One drop was applied to an 3"×4" (7.6 cm×10 cm) test panel (Cormax 6EP e-coat, 708DM730 primer, 648DN027 black base coat and Du Pont RK8014 clear coat, obtained from ACT Laboratories, Hillsdale, Mich.) which had been cleaned with 3M CAR WASH SOAP from 3M Company diluted 128:1 with deionized water. The drop was spread over the panel with a piece of orange SHAMWOW! felted cloth (ShamWow, Germany). The panel was dried flat at room temperature. Once dried it exhibited some streaking and very mild iridescence. After about seven weeks exposure to normal laboratory conditions, the coating showed very good water wettability under tap water. It was manually scrubbed with moderate pressure using a damp paper towel and appeared to remain intact. After this scrubbing, three static contact angles were measured on this coated panel and found to be 17.2°, 14.6°, and 12.0°. The panel was then positioned in the tray of a BYK-Gardner Abrasion Tester of Columbia Md. and scrubbed through 100 cycles with a wet 3M O-CEL-O sponge from 3M Company with excess deionized water present. The static contact angle was again measured on three drops and was found to be 18.2°, 19.0°, and 16.6°, the minor difference from the previously measured values being very small and indicating that the coating remained largely intact, which was also indicated by the appearance of the coating.

Example 43

An aqueous coating with 1 percent by weight total solids and a 90:10 ratio of NALCO 1115 silica particles to polyacrylic-acrylamide copolymer PAA1 having a pH of 3.08 as determined with a pH meter after having been passed through an ion exchange resin was evaluated as follows. Eight 1"×2" (2.5 cm×5.1 cm) test panels (Cormax 6EP e-coat, 708DM730 primer, 648DN027 black base coat and Du Pont RK8014 clear coat, obtained from ACT Laboratories,) were sprayed with 200 proof ethanol and wiped dry. One drop was applied to each of the first six panels and wiped down the long axis of the panel using a small piece of the indicated applicator material; the applicator material was approximately 1"×½"×⅜" in size; panels were dried flat. The seventh panel was flooded with the coating using a plastic pipette which was used to lightly spread the coating to the panel's edges; after 30 seconds in a horizontal position, the panel was gently rinsed with tap water from a laboratory squirt bottle and positioned vertically to drain and dry. The eighth panel was cleaned and left uncoated as a control. Appearance of the panels was noted after application and air drying. Static contact angles were measured on three drops applied along the long axis of the test panels and the average computed.

The static water contact angle measurements (SWCA) were made using purified and filtered water, obtained under the trade designation OMNISOLV from EM Science, Gibbstown, N.J. The contact angle analyzer used a custom-built manual instrument equipped with a goniometer-microscope obtained from Gaertner Scientific Corporation, Chicago, Illinois, mounted on a horizontal positioning device, model number UNISLIDE SERIES A2500 made by Velmex, Inc., Holcomb, N.Y. Water droplets approximately 0.5 microliters (μl) in volume were dispensed from a 1 cubic centimeter ($cm^3$) syringe having a flat-tipped needle, obtained from Henke Sass Wolf GmbH, Tuttlinger, Germany, using a micrometer thimble, barrel, and spindle, Part No. 263, from L. S. Starrett, Athol, Mass. The syringe was mounted on a double-armed holder which that was lowered through a screw crank to deposit the water drop on the test specimen as it rested on an adjustable platform. The drop was backlit through a translucent paper screen with a small lamp. The leveling of the contact angle instrument was monitored with a circular bull's-eye level, adjustable through four leveling screws. Contact angle was measured on sessile water drops approximately 30 seconds after deposition, and the value reported is the average of measurements made on at least three separate drops on each test panel.

| EXAMPLE | APPLICATOR MATERIAL | APPLICATOR MATERIAL SUPPLIER | APPEARANCE | AVERAGE STATIC CONTACT ANGLE (°) |
|---|---|---|---|---|
| 43-1 | RUBICELL | Toyo Polymer Co., Indonesia | Clear | 2.6 |

-continued

| EXAMPLE | APPLICATOR MATERIAL | APPLICATOR MATERIAL SUPPLIER | APPEARANCE | AVERAGE STATIC CONTACT ANGLE (°) |
|---|---|---|---|---|
| 43-2 | ORANGE SHAMWOW! | ShamWow, Germany | Streaked | 0.6 |
| 43-3 | FOLDED KIM-WIPE | Kimberly-Clark, Roswell, Georgia | Clear | 41.2 |
| 43-4 | AUTOSHOW QUIKPAD | Armaly Brands, Walled Lake, Mich. | Streaked, iridescent | 1.0 |
| 43-5 | MEDISPONGE 50P PSS-M | Lendell Manufacturing, St. Charles, Mich. | Clear | 42.6 |
| 43-6 | WILSORB FOAM | Pintafoamtec, Minneapolis, Minn. | Clear | 18.1 |
| 43-7 | Flooded and rinsed | NA | Clear | 20.4 |
| 43-8 | None | NA | Clear | 71.7 |

All patents and publications referred to herein are hereby incorporated by reference in their entirety. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A composition comprising:
   an aqueous continuous liquid phase;
   spherical silica particles dispersed in the aqueous continuous liquid phase, wherein the spherical silica particles have a volume average particle diameter of 60 nanometers or less; and
   a water-soluble copolymer of acrylic acid and an acrylamide, or a salt thereof, wherein the acrylamide is represented by the formula

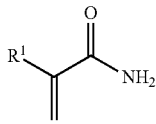

wherein $R^1$ is H or a methyl group, and wherein a weight ratio of the acrylamide to the acrylic acid is in a range of from 20:80 to 95:5, and
   wherein a weight ratio of the spherical silica particles to the water-soluble copolymer of acrylic acid and an acrylamide, or a salt thereof, is in a range of from 70:30 to 97:3, and wherein the composition has a pH of less than 3.

2. The composition of claim 1, wherein a weight ratio of the spherical silica particles to the water-soluble copolymer of acrylic acid and acrylamide is in a range of from 85:15 to 95:5.

3. The composition of claim 1, wherein the composition has a metal ion concentration of less than 60 parts per million by weight based on a total weight of the composition.

4. The composition of claim 1, wherein the composition is free of acicular silica particles.

5. The composition of claim 1, wherein the composition is essentially free of volatile organic solvent.

6. A method of making an article, the method comprising applying the composition of claim 1 to a surface of a substrate and at least partially removing the aqueous continuous liquid phase from the composition.

7. The method of claim 6, wherein the composition is applied to the substrate using a hydrophilic applicator that contacts the substrate to apply the composition.

8. The method of claim 6, wherein the surface comprises at least one of glass, metal, or ceramic.

9. The method of claim 6, wherein the surface comprises an organic polymer.

10. The method of claim 9, wherein the surface comprises fiberglass.

11. The method of claim 6, wherein the substrate is selected from the group consisting of shower surrounds, bathtubs, toilets, sinks, faucets, windows, and mirrors.

12. The method of claim 6, wherein the substrate comprises a painted surface or a clearcoat surface.

13. An article made by the method of claim 6.

14. A method of making a composition, the method comprising combining:
   an aqueous dispersion of spherical silica particles, wherein the spherical silica particles have a volume average particle diameter of 60 nanometers or less, and
   an aqueous solution comprising a water-soluble copolymer of acrylic acid and an acrylamide, or a salt thereof, wherein the acrylamide is represented by the formula

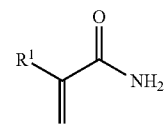

to provide a composition, wherein $R^1$ is H or a methyl group, and wherein a weight ratio of the acrylic acid to the acrylamide is in a range of from 20:80 to 95:5, and wherein a weight ratio of the spherical silica particles to the water-soluble copolymer of acrylic acid and an acrylamide, or a salt thereof, is in a range of from 70:30 to 97:3; and
   contacting the composition with a protonated cation exchange resin, wherein the composition has a pH of less than 3.

15. The method of claim 14, wherein the composition is free of acicular silica particles.

* * * * *